(12) United States Patent
Fuchs et al.

(10) Patent No.: US 7,720,267 B2
(45) Date of Patent: May 18, 2010

(54) METHOD AND APPARATUS FOR CLASSIFYING TISSUE USING IMAGE DATA

(75) Inventors: Thomas Fuchs, Graz (AT); Bernd Wachmann, Lawrenceville, NJ (US); Claus Neubauer, Monmouth Junction, NJ (US); Jie Cheng, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 851 days.

(21) Appl. No.: 11/426,329

(22) Filed: Jun. 26, 2006

(65) Prior Publication Data

US 2007/0123773 A1 May 31, 2007

Related U.S. Application Data

(60) Provisional application No. 60/699,805, filed on Jul. 15, 2005.

(51) Int. Cl.
*G06K 9/00* (2006.01)
*A61B 5/05* (2006.01)

(52) U.S. Cl. ..................... 382/128; 600/410

(58) Field of Classification Search .............. 382/128, 382/129, 130, 131, 132, 133, 134, 159, 165, 382/170, 190, 224, 227; 600/407, 410, 411, 600/427, 473–478, 334, 338, 358, 442, 562; 128/920, 922; 607/50, 51, 149
See application file for complete search history.

(56) References Cited

U.S. PATENT DOCUMENTS 5,987,346 A * 11/1999 Benaron et al. ............ 600/407
6,026,323 A * 2/2000 Skladnev et al. ........... 600/547
6,405,065 B1 * 6/2002 Malin et al. ................ 600/310
6,498,945 B1 * 12/2002 Alfheim et al. ............. 600/407
2002/0186875 A1 * 12/2002 Burmer et al. ............. 382/133
2005/0043614 A1 * 2/2005 Huizenga et al. ........... 600/427

OTHER PUBLICATIONS

Unal, G. et al., "Joint Segmentation and Non Rigid Registration Without Shape Priors," Technical Report SCR 04 TR 7495 Siemens Corporate Research (2004).
Harisinghani M.G., et al. "Noninvasive Detection of Clinically Occult Lymph Node Metastases in Prostate Cancer," N, Engl J. Med, (2003) 348:25 pp. 2491-2499.
Harisinghani M., et al., "Sensitive, Noninvasive Detection of Lymph Node Metastases,"PLoS MED (2004) 1:3 p. 66.
Fayyad U.M., et al., "Multi interval Discretization of Continuous Valued Attributes for Classification Learning," Proc of 13 Int'l Joint Conf on AI, (1993) pp. 1022-1027.

(Continued)

*Primary Examiner*—Abolfazl Tabatabai (57) ABSTRACT

Disclosed is a technique for classifying tissue based on image data. A plurality of tissue parameters are extracted from image data (e.g., magnetic resonance image data) to be classified. The parameters are preprocessed, and the tissue is classified using a classification algorithm and the preprocessed parameters. In one embodiment, the parameters are preprocessed by discretization of the parameters. The classification algorithm may use a decision model for the classification of the tissue, and the decision model may be generated by performing a machine learning algorithm using preprocessed tissue parameters in a training set of data. In one embodiment, the machine learning algorithm generates a Bayesian network. The image data used may be magnetic resonance image data that was obtained before and after the intravenous administration of lymphotropic superparamagnetic nanoparticles.

34 Claims, 7 Drawing Sheets

OTHER PUBLICATIONS

Ihaka R. et al., "R: A Language for Data Analysis and Graphics,"Journal of Computational & Graphical Statistics, (1996) 5:3 pp. 299-314.

Cheng J., et al. "Learning Belief Networks from Data,"Proc of Conf on Info and Knowledge Management (CIKM) (1997) pp. 325-331.

Cheng J. et al., "Learning Bayesian Belief Network Classifiers: Algorithms and System,"Lecture Notes in Computer Science, (2001) vol. 2056 pp. 141-151.

Cheng J. et al., "KDD Cup| 2001 Report,"SIDKDD Explorations (2002) 3:2 pp. 47-64.

Geiger, D. et al., "Logical and Algorithmic Properties of Conditional Independence and Graphical Models,"The Annals of Statistics, (1993) 21:4 pp. 2001-2021.

Shacter R., "Bayes Ball: The Rational Pastime,"Proc of the 14 Annual Conf on Uncertainty in Artificial Intelligence (1998) (UAI-98).

Kohavi R., "A Study of Cross Validation and Bootstrap for Accuracy Estimation and Model Selection," Int'l Joint Conf on Artificial Intelligence (1995) (IGCAI).

Cheng J., et al., "Comparing Bayesian Network Classifiers, "Proc of the 15 Annaul Conf on Uncertainty in Artificial Intelligence (1999) (UAI 99), pp. 101-107.

"The Jung, "Technical Report UCI ICS 03 17, School of Inform and CS, Univ of CA, Irvine downloaded from http://www.datalab.uci.edu/papers/JUNG_tech_report.html on Jun. 15, 2006.

Shen, T. et al. "Moncorystalline Iron Oxide Nanocompounds (MION): Physicochemical Properties,"(1993) Magn. Reson. MED (MRM) 29:559-604.

Nathwani et al., "Evaluation Of An Expert System On Lymph Node Pathology", Human Pathology, vol. 28, No. 9, Sep. 1997, pp. 1097-1103.

* cited by examiner

FIG. 1

| PARAMETER | AVERAGE | STD. DEV. | MEDIAN | MIN | MAX | SKEWNESS | KURTOSIS |
|---|---|---|---|---|---|---|---|
| dSNR | 5.247 | 3.165 | 4.398 | 0.0655 | 18 | −0.207 | 0.9166 |
| dT2star | 48.62 | 12.28 | 50.54 | 0 | 70.14 | −0.99 | 4.93 |
| SNR | 2.524 | 1.767 | 2.08 | 0.715 | 9.52 | 1.78 | 5.52 |
| LNM | 0.01739 | 0.0204 | 0.01085 | 0.00467 | 0.109 | 2.554 | 10.55 |
| T2star | 10.139 | 7.067 | 7.555 | 2.087 | 48.10 | 1.448 | 11.99 |
| PixelVar | 100.06 | 62.27 | 90.77 | 7.58 | 488.09 | 4.89 | 22.75 |

FIG. 2

| PARAMETER | AVERAGE | STD. DEV. | MEDIAN | MIN | MAX | SKEWNESS | KURTOSIS |
|---|---|---|---|---|---|---|---|
| dSNR | 1.022 | 3.739 | 0.644 | −12.98 | 8.34 | −1.92 | 7.41 |
| dT2star | 22.395 | 13.46 | 21.75 | 0 | 58.83 | 0.497 | 0.395 |
| SNR | 6.057 | 3.218 | 6.189 | 0.8191 | 14.69 | 0.585 | −0.145 |
| LNM | 0.049 | 0.033 | 0.044 | 0.01 | 0.189 | 1.934 | 6.167 |
| T2star | 33.98 | 12.03 | 34.37 | 0 | 58.20 | −0.523 | 0.841 |
| PixelVar | 976.3 | 1033.9 | 636.53 | 59.92 | 4881.89 | 2.27 | 5.42 |

FIG. 3

| PARAMETER | THRESHOLDS |
|---|---|
| LNM RATIO | 0.014; 0.029 |
| T2* | 20.527 |
| $\delta$T2* | 35.625 |
| SNR | 3.216 |
| $\delta$SNR | 1.171 |
| PIXEL VARIANCE | 167.925; 500.045 |

| LNM RATIO | T2* | $\delta$t2* | SNR | PIXEL VARIANCE | PATHOLOGIC CLASS |
|---|---|---|---|---|---|
|  |  |  |  |  |  |
|  |  |  |  |  |  |
|  |  |  |  |  |  |

METHOD AND APPARATUS FOR CLASSIFYING TISSUE USING IMAGE DATA

This application claims the benefit of U.S. Provisional Application No. 60/699,805 filed Jul. 15, 2005, which is incorporated herein by reference.

BACKGROUND OF THE INVENTION

The present invention relates generally to tissue classification, and more particularly to classifying a pathological state of tissue based on image data.

Accurate detection of tissue metastases is essential in optimizing treatment for solid cancers. In particular, there is a need for non-invasive techniques for identifying such metastases. The following description will generally focus on detection of lymph-node metastases, but it should be understood that the present invention is not so limited, and can be applied to any type of tissue.

Magnetic resonance imaging (MRI) is a non-invasive technique for providing images with excellent anatomical detail and soft tissue contrast, but is generally unsuitable for detection of lymph-node metastases. However, the quality of MRI can be improved by using different imaging agents and acquisition techniques. More particularly, the quality of MRI can be improved by the use of contrast agents, such as intravenous administration of lymphotropic superparamagnetic nanoparticles. Such techniques are described in M. G. Harisinghani, J. Barentsz, P. F. Hahn, W. M. Desemo, S. Tabatabaci, C. H. van de Kaa, J. de la Rosette, and R. Weissleder, "Noninvasive Detection Of Clinically Occult Lymph-Node Metastases In Prostate Cancer," N Engl J Med, vol. 348, no. 25, pp. 2491-2499, 2003; T. Shen, R. Weissleder, M. Papisov, A. Jr. Bogdanov, T J. Brady, "Monocrystalline Iron Oxide Nanocompounds (Mion):Physicochemical Properties," Magn Reson Med., vol. 29, no. 5, pp. 599-604, 1993; and M. Harisinghani and R. Weissleder, "Sensitive Noninvasive Detection Of Lymph Node Metastases," PloS Med 1(3), p. e66, 2004.

High quality MRI images, obtained using the techniques described above, may be used to detect lymph-node metastases using the following sequence of steps.

1. Detection
2. Segmentation
3. Classification; and
4. Visualization

Detection includes finding the location of a lymph node in the MRI images, and may be performed manually or using an automated algorithm. Detection is further described in M. Harisinghani and R. Weissleder, "Sensitive Noninvasive Detection of Lymph Node Metastases," PloS Med 1(3), p. e66, 2004). Segmentation includes separating the lymph node from the surrounding area in the image, and may also be performed manually or using an automated algorithm. Segmentation is further described in G. Unal, G. Slabaugh, A. Yezzi and J. Tyan, "Joint Segmentation And Non-Rigid Registration Without Shape Priors", SCR-04-TR-7495, Siemens Corporate Research (2004). In the detection and segmentation steps, several parameters are extracted from the image describing magnetic, geometric and spatial properties of the lymph-node tissue. These parameters, which will be discussed in further detail below, are used in the classification step to classify the pathological state of the lymph-node using a previously generated decision model. Finally, in the visualization step, the extracted and classified data of the lymph node are visualized, both in 2-dimensions and 3-dimensions, to allow for comprehensive description and support for a diagnosis. Further, the visualization may serve as a map to locate a malignant node during surgery.

The classification step is generally performed using machine learning techniques which operate under supervision provided by a known classification for each of a number of training examples. The goal of machine learning is to discover any structure in the data that is informative for classifying the data. Statistical classification is a type of machine learning that takes a feature representation of data (e.g., image parameters) and maps it to a classification label. A classification algorithm is designed to learn (to approximate the behavior of) a function that maps a vector of parameters $(X_1, X_2, \ldots X_N)$ into one of several classes by looking at several input-output examples (training data) of the function. The training data consists of pairs of input objects (vectors) from clinical data, and the pathological proven class. The output of the function can be a continuous value or can predict a class label of the input object.

The direct approach for classification is a linear analysis of the parameters, for example as described in M. Harisinghani and R. Weissleder, "Sensitive Noninvasive Detection Of Lymph Node Metastases," PloS Med 1(3), p. e66, 2004. The aim is to find thresholds or cut-off values for the parameters, which discriminate best between the given classes based on a comparison with the proven class. A variety of methods exist for estimating these thresholds. However, the main drawback of this simple linear analysis is the fact that parameters can only be examined one at a time. We have found that no single parameter, by itself, has enough discriminatory power to accurately distinguish between benign and malignant lymph-nodes.

BRIEF SUMMARY OF THE INVENTION

The present invention provides an improved technique for classifying tissue based on image data.

In one embodiment, a plurality of tissue parameters are extracted from image data (e.g., magnetic resonance image data) to be classified. The parameters are preprocessed, and the tissue is classified using a classification algorithm and the preprocessed parameters. In one embodiment, the parameters are preprocessed by discretization of the parameters.

The classification algorithm may use a decision model for the classification of the tissue. The decision model may be generated by performing a machine learning algorithm using preprocessed tissue parameters, where the tissue parameters were extracted from image data. In one embodiment, the machine learning algorithm generates a Bayesian network.

The image data used may be magnetic resonance image data that was obtained before and after the intravenous administration of lymphotropic superparamagnetic nanoparticles.

These and other advantages of the invention will be apparent to those of ordinary skill in the art by reference to the following detailed description and the accompanying drawings.

DETAILED DESCRIPTION

Figure 1:
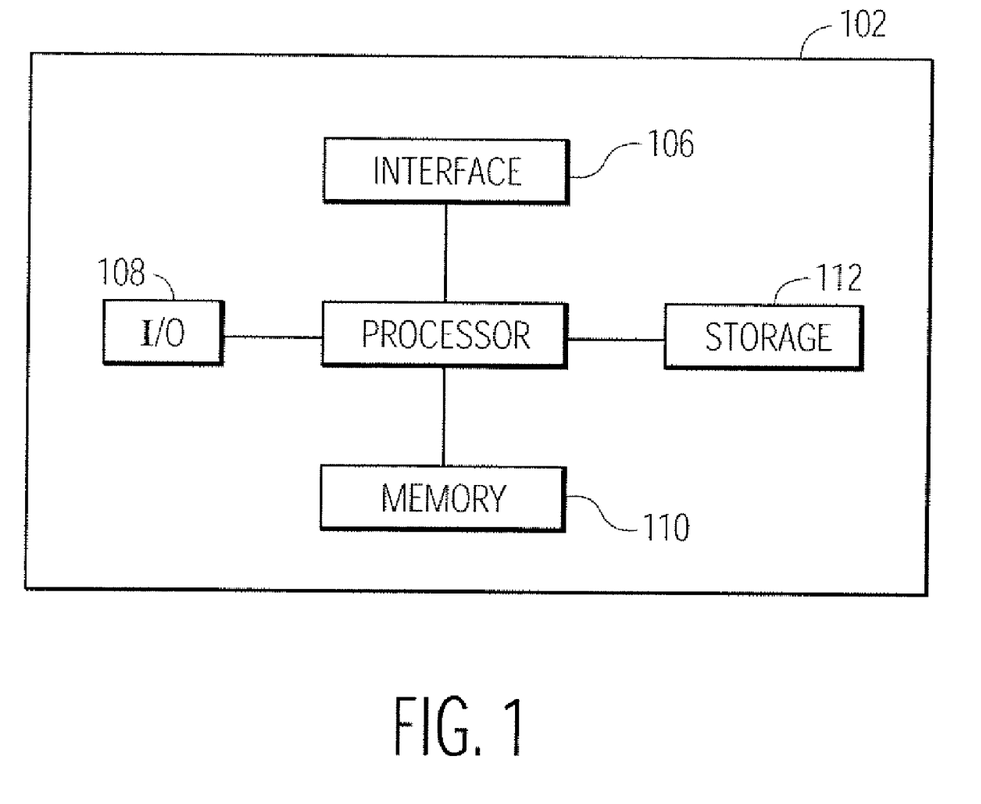
FIG. 1 shows a high level block diagram of a computer which may be used to implement the present invention.

The processing steps described herein may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 1. Computer 102 contains a processor 104 which controls the overall operation of computer 102 by executing computer program instructions which define such operation. The computer program instructions may be stored in a storage device 112 (e.g., magnetic disk, optical disk, or any other computer readable medium) and loaded into memory 110 when execution of the computer program instructions is desired. Memory 110 may also be used to store data used during the various steps of the method. Computer 102 also includes one or more interfaces 106 for communicating with other devices (e.g., locally or via a network). Computer 102 also includes input/output 108 which represents devices which allow for user interaction with the computer 102 (e.g., display, keyboard, mouse, speakers, buttons, etc.). One skilled in the art will recognize that an implementation of an actual computer will contain other components as well, and that FIG. 1 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Further, in various implementations, the functions described herein may be performed on a dedicated apparatus, or the functions may be part of a device that performs other functions as well.

The present invention uses tissue parameters that are extracted from image data. The image data is data output from a magnetic resonance imaging device, as is well known in the art. In one embodiment, the image data is extracted manually. In an alternate embodiment, the parameters may be extracted automatically from the image data. In an advantageous embodiment, the images are acquired before, and 24 hours after, the intravenous administration of lymphotropic superparamagnetic nanoparticles. These images are referred to herein as pre-contrast and post-contrast scans, respectively. The following is a description of these parameters.

LNM Ratio Lymph Node/Muscle Ratio. This ratio is calculated from the post-contrast scans by dividing the signal intensities of an entire lymph node by that of an adjacent muscle using a similar-sized region of interest (ROI).

T2* T2* is calculated in nodal ROIs on dual TE (sampling time in the transverse plane) images. T2* maps are constructed by performing fits of a standard exponential relaxation model ($S=Ke^{TE/T2*}$) to the data on a pixel-by-pixel basis. Only pixels with an intensity greater than a threshold level (2× the noise) are considered during the fitting process. This is further described in M. Harisinghani and R. Weissleder, "Sensitive Noninvasive Detection of Lymph Node Metastases," PloS Med 1(3), p. e66, 2004.

δT2* The difference between T2* in the pre-contrast and post-contrast scans.

SNR The signal-to-noise ratio. ($S/S_{noise}$).

$$s = \sqrt{\frac{1}{N-1} \sum_{i=1}^{N} (x_i - \bar{x})^2}$$

δSNR The difference between SNR in the pre-contrast and post-contrast scans.

Pixel Variance The Pixel Variance is the second central moment of the distribution of pixel values in the three dimensional region in the MR image related to the lymph node, and is obtained from the postcontrast scans.

Pathologic class The class denotes benign or malignant nodes and is determined histologically by an expert.

Figure 2:
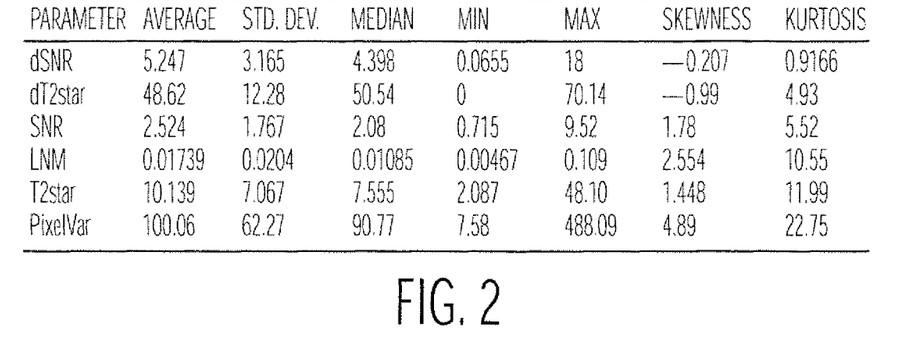
FIG. 2 is a table showing various numerical values for parameters acquired from benign tissue.
Figure 3:
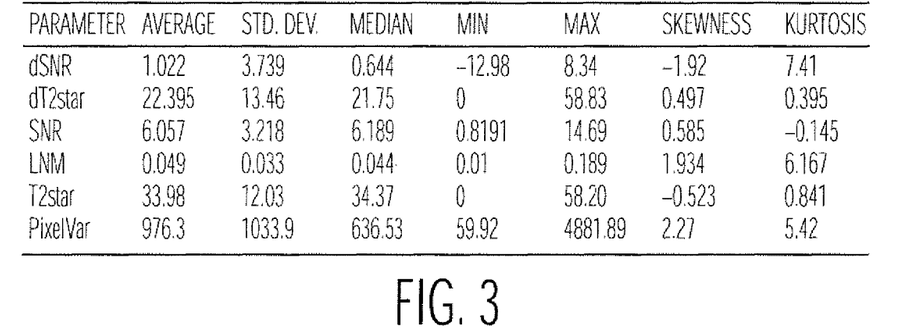
FIG. 3 is a table showing various numerical values for parameters acquired from malignant tissue.
Figure 4:
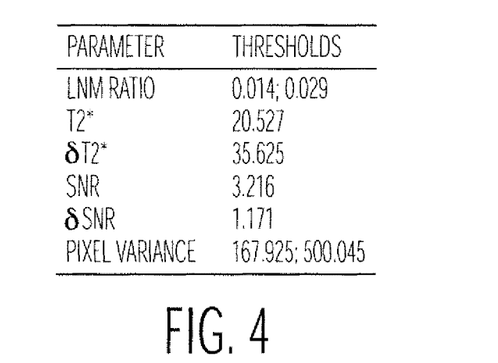
FIG. 4 is a table showing various thresholds of discretized tissue parameters.

The dataset used in experimentation consists of 216 histologically validated lymph nodes and included 46 malignant and 170 benign nodes from the full spectrum of normal nodes to completely replaced nodes. The data show different ranges of values and types of distributions. FIG. 2 shows the numerical values of the mean value (average), the standard deviation, the median, minimum, maximum, skewness and kurtosis for each parameter for the benign tissue, and FIG. 3 shows the same information for the malignant tissue. The data distributions differ significantly from normal distributions, as can be seen from the values for skewness and kurtosis. Apart from the Pixel-Variance parameter, the standard deviations of the parameters are in the same order of magnitude for both malignant and benign nodes. The different scales and widths of the parameter distributions can potentially cause problems when the parameters are combined. However, the data are discretized for subsequent usage with Bayesian Networks (as described in further detail below). Underlying the discretization is a parameter specific range, which guarantees that differences in the distributions are compensated for. However, the discretization also causes a certain loss of information. The discretization may be performed using the method described in U. M. Fayyad and K. B. Irani, "Multi-Interval Discretization Of Continuous Valued Attributes For Classification Learning," Proceedings of the Thirteenth International Joint Conference on Artificial Intelligence, Morgan Kaufmann, San Francisco, Calif., pp. 1022-1027, 1993. One of the advantages of this method is that it is capable of splitting up a feature into more than two ranges (binary) and therefore produces nominal data. In addition, the number of ranges can vary from feature to feature. The Bayesian network algorithm (as described below) can utilize this property to build probability tables of different sizes for different features. As a result the final Bayesian network can be more compact and with a binary discretizer, which has implications on the speed and the interpretability of the model. The computed thresholds using this method are shown in FIG. 4. It is noted that the LNM Ratio and Pixel Variance parameters are discretized into three bins and therefore two thresholds are given for these parameters.

The following terms are defined here for use in describing the present invention.

Cut-off Value: A cut-off value is a threshold, which splits up the range of the values of a feature or parameter into ranges for the associated classes.

Directed Graph: A directed graph G can be defined as an ordered pair that consists of a finite set V of nodes and an irreflexive adjacency relation E on V. The graph G is denoted as (V,E). For each (x, y)∈ E we say that there is an arc (directed edge) from node x to node y. In the graph, this is denoted by an arrow from x to y and x and y are called the start point and the end point of the arrow respectively. We also say that node x and node y are adjacent or x and y are neighbors of each other. x is also called a parent of y and y is called a child of x. By using the concepts of parent and child recursively, we can also define the concept of ancestor and descendant. We also call a node that does not have any parent a root node. By irreflexive adjacency relation we mean that for any x∈V, (x,x)∉E, i.e. an arc cannot have a node as both its start point and end point.

Adjacency Paths: In Bayesian network learning, we often need to find a path that connects two nodes without considering the directionality of the edges on the path. To distinguish it from the directed path that connects two nodes by the arcs of a single direction, we call this kind of path an adjacency path or chain. This definition is applicable to directed graphs, undirected graphs and mixed graphs.

DAG: A directed acyclic graph (DAG) is a directed graph that contains no directed cycles.

Collider: For any node in an adjacency path, if two arcs in the path meet at their end point on node v, we call v a collider of the path since two arrows "collide" at v. A node that is not a collider of a path is called a non-collider of the path. Note that the concept of collider is always related to a particular path. A node can be a collider in one path and a non-collider in another path.

CI: Conditional Independence (CI) is defined as follows: Let U={A,B, . . . } be a finite set of variables with discrete values. Let P(•) be a joint probability function over the variables in U, and let X, Y, and Z be any three subsets of variables in U. X and Y are said to be conditionally independent given Z if P(x|y, z)=P(x|z) whenever P(y|z)>0. X and Y are also said to be independent conditional on Z.

d-separation: For a DAG G=(V,E), X, Y ∈V and X≠Y and C⊂V\{X,Y}, we say that X and Y are d-separated given C in G if and only if there exists no adjacency path P between X and Y, such that (i) every collider on P is in C or has a descendant in C and (ii) no other nodes on path P is in C. C is called a cut-set. If X and Y are not d-separated given C we say that X and Y are d-connected given C. We denote d-separation with the symbol ⊥.

Markov Blanket: In a DAG G=(V,E) the Markov Blanket of a node X∈V consists of the node's parents, its children, and its children's parents. A node X∈V is conditionally independent of the entire graph, given its Markov Blanket.

As described above in the background section, classification using linear analysis of the parameters provides inadequate results, because no parameter by itself has enough discriminatory power to accurately distinguish between benign and malignant nodes. Therefore, a Bayesian network classifier is used in accordance with an embodiment of the invention.

A Bayesian network is a directed acyclic graph (DAG) of nodes representing variables and arcs symbolizing dependence relations among the variables. If there is an arc from node A to another node B, then A is a parent of B. If a node has a known value, it is an evidence node. In the present embodiment, the nodes represent the image parameters discussed above. To construct the Bayesian network, which then can be used as a classifier, a dependency analysis algorithm is used. The algorithm in accordance with an embodiment of the present invention is generally based on J. Cheng, D. A. Bell, and W. Liu, "Learning Belief Networks From Data: An Information Theory Based Approach," in Proc. of Conf. on Information and Knowledge Management (CIKM), 1997, pp. 325-331; J. Cheng and R. Greiner, "Learning Bayesian Belief Network Classifiers: Algorithms And System," Lecture Notes in Computer Science, vol. 2056, pp. 141-151, 2001; and J. Cheng, C. Hatzis, H. Hayashi, M. -A. Krogel, S. Morishita, D. Page, and J. Sese, "KDD Cup 2001 Report," SIGKDD Explorations, vol. 3, no. 2, pp. 47-64, 2002. However, the algorithm in accordance with an embodiment of the invention extends these algorithms in various ways. The algorithm uses information theoretic measures to detect conditional independence relations and the concept of d-separation is applied to infer the structure of the network. This is possible because it has been shown in D. Geiger and J. Pearl, "Logical And Algorithmic Properties Of Conditional Independence ," Technical Report R-97, Cognitive Systems Laboratory, UCLA, 1988, that the concept of d-separation can reveal all the conditional independence relations that are encoded in a Bayesian network. In the learning algorithm, the volume of the information flow between two parameters is measured to determine if a group of values corresponding to a condition-set can reduce and eventually block the information flow. These results guide the construction of the correct structure of a Bayesian network from a given data set. Therefore, the mutual information between two nodes can indicate if two nodes are dependent and how close their relationship is. The mutual information of two nodes $X_i$, $X_j$ is defined as $$I(X_i, X_j) = \sum_{x_i, x_j} P(x_i, x_j) \log \frac{P(x_i, x_j)}{P(x_i)P(x_j)} \quad (1)$$

and the conditional mutual information is defined as $$I(X_i, X_j | C) = \sum_{x_i, x_j, c} P(x_i, x_j, c) \log \frac{P(x_i, x_j | c)}{P(x_i | c)P(x_j | c)} \quad (2)$$

where C is a set of nodes. When $I(X_i, X_j)$ is smaller than a certain threshold $\epsilon$, $X_i$, $X_j$ are considered marginally independent. When $I(X_i, X_j|C)$ is smaller than $\epsilon$, $X_i$, $X_j$ are conditionally independent given C.

Figure 5:
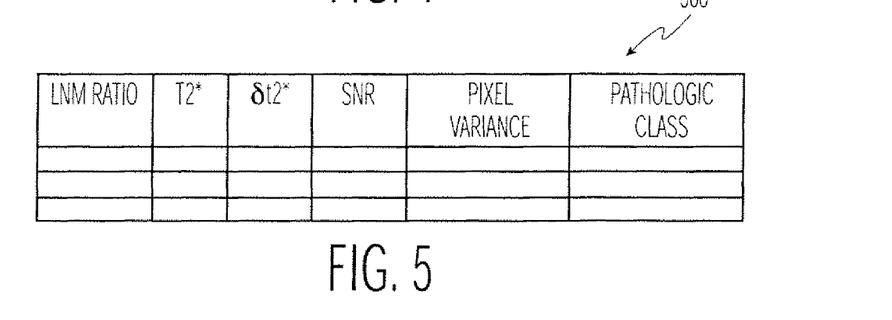
FIG. 5 shows a database table of tissue parameters.

To learn the Bayesian network from data, a database table 500 of parameters, as shown in FIG. 5, is used as input. Each parameter (column) of the table 500 is treated as a random variable, which is represented by a node in the Bayesian network. Each record (row) of the table 500 is a complete instantiation of the random variables in the domain. The marginal and conditional probabilities in equations (1) and (2) are estimated using the relative frequencies calculated from the table 500.

Figure 6:
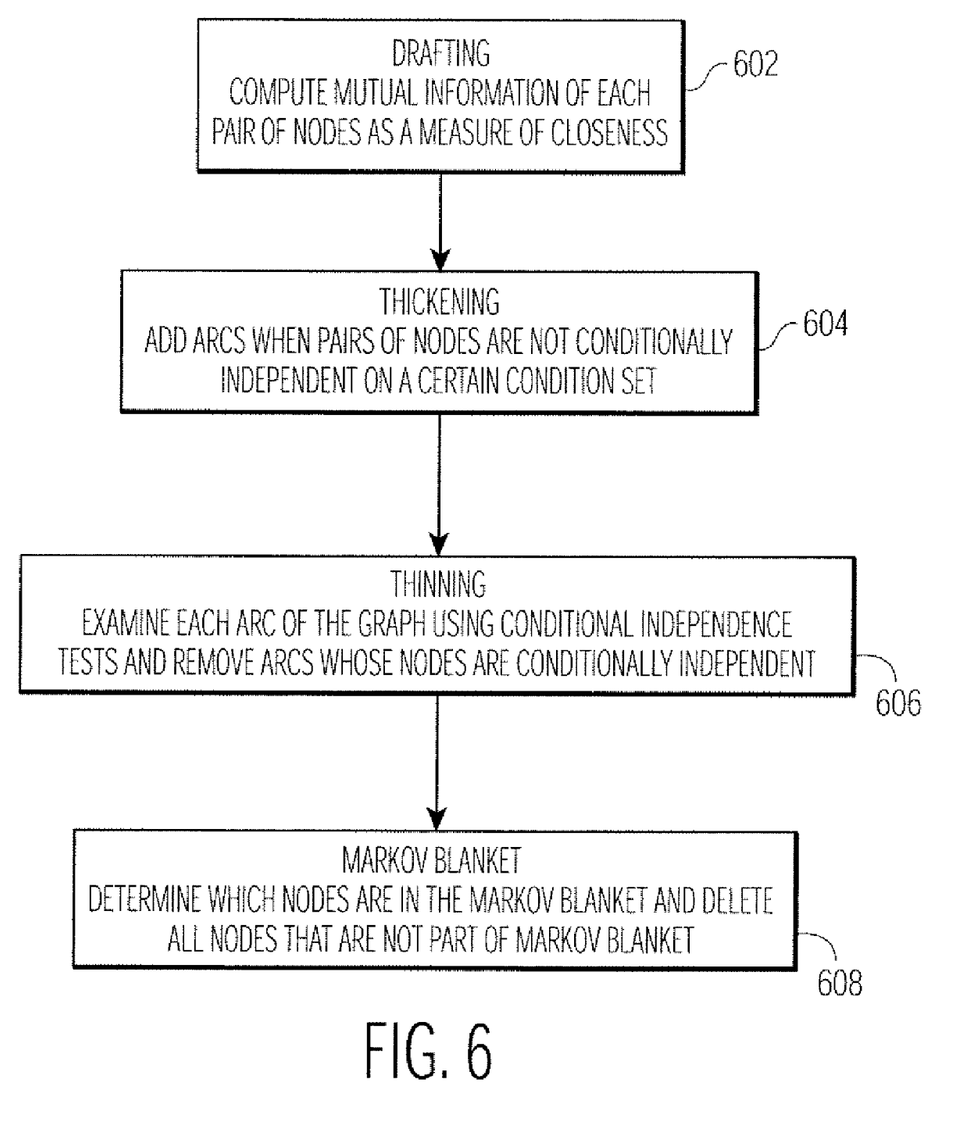
FIG. 6 is a flowchart illustrating a four-phase construction algorithm for constructing a Bayesian network.

The Bayesian network is constructed based on a four-phase construction algorithm as shown in FIG. 6. The first phase 602 computes the mutual information of each pair of nodes as a measure of closeness, and creates a draft based on this information. The second phase 604 adds arcs when the pairs of nodes are not conditionally independent on a certain condition-set. In the third phase 606, each arc of the graph is examined using conditional independence tests and is removed if the two nodes of the arc are conditionally independent. In the last phase 608 the Markov Blanket of the class node is calculated and all nodes which are not part of it are deleted from the graph. This Bayesian network construction algorithm is known in the art, and is described in further detail in J. Cheng, D. A. Bell, and W. Liu, "Learning Belief Networks from Data: An information Theory Based Approach," in Proc. of Conf. on Information and Knowledge Management (CIKM), 1997, pp. 325-331. Further details of each of the phases is described below.

Figure 7:
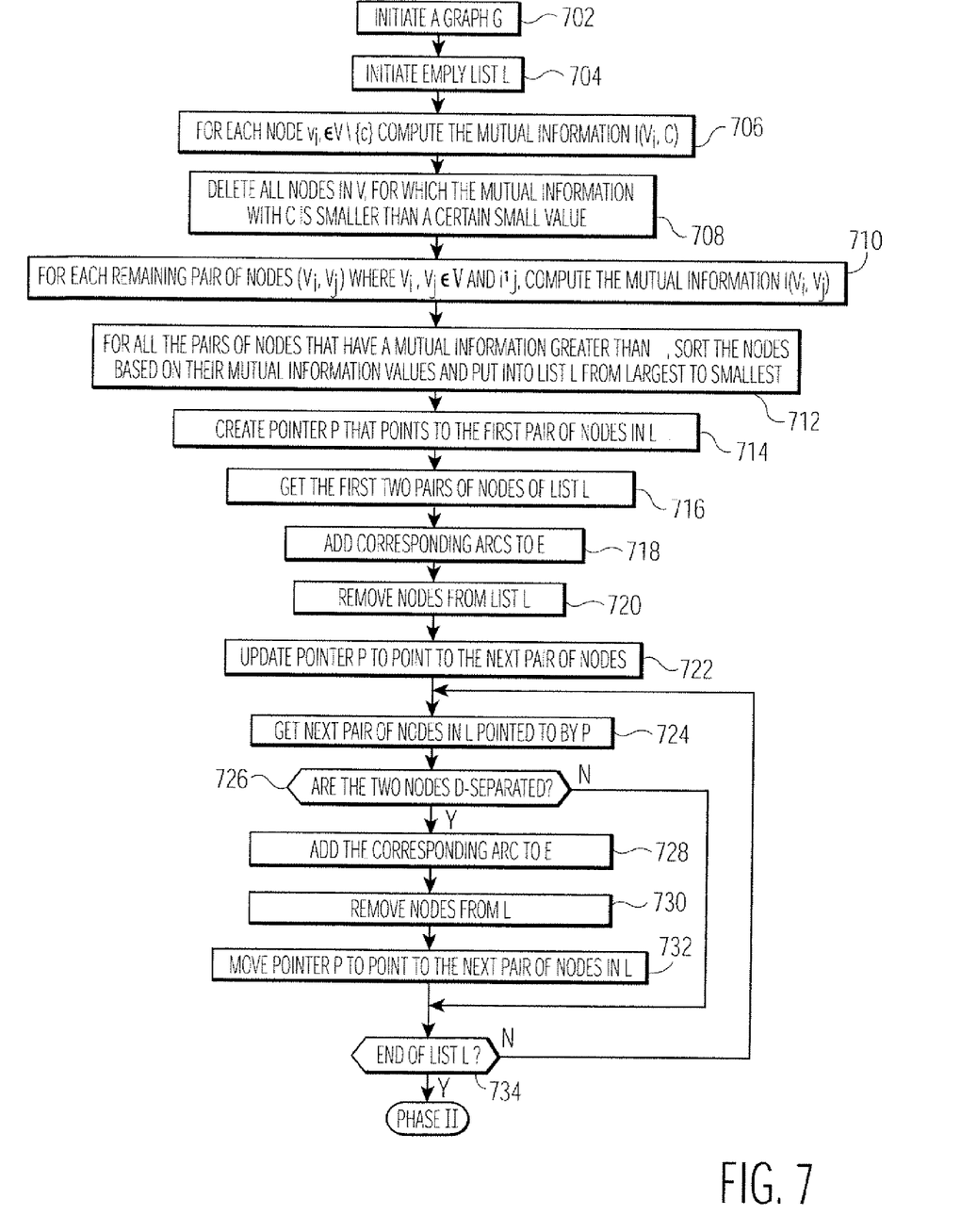
FIG. 7 shows a flowchart illustrating further details of phase I of the four-phase construction algorithm of FIG. 6.

FIG. 7 shows a flowchart illustrating further details of phase I of FIG. 6. In step 702 a graph G=(V, E) is initiated where V={all the parameters of data set} U {class-node}, E={Ø}. Next, in step 704 an empty list L is initiated. Next, in step 706, for each node $v_i \in V\setminus\{c\}$ the mutual information $I(v_i, c)$ is computed with the class node c using equation (1). In step 708 and all nodes in V, for which the mutual information with c is smaller than a certain small value $\epsilon$, are deleted. In step 710, for each remaining pair of nodes $(v_i, v_j)$ where $v_i, v_j \in V$ and $i \neq j$, the mutual information $I(v_i, v_j)$ is computed using equation (1). In step 712, for all the pairs of nodes that have a mutual information greater than $\epsilon$, the nodes are sorted based on their mutual information values and are put into the list L, from largest to smallest. In step 714 a pointer p is created that points to the first pair of nodes in L. Next, in step 716, the first two pairs of nodes of list L are obtained, the corresponding arcs are added to E in step 718, and the nodes are removed from the list in step 720. The pointer p is updated to point to the next pair of nodes in step 722. Next, in step 724 the pair of nodes in L pointed to by the pointer p are obtained. In step 726 it is determined whether the two nodes are d-separated. This determination is made using the Bayes-Ball algorithm, as described in R. Shachter, "Bayes-Ball: The Rational Pastime (For Determining Irrelevance And Requisite Information In Belief Networks And Influence Diagrams)," Proceedings of the 14th Annual Conference on Uncertainty in Artificial Intelligence, (UAI-98), publisher Morgan Kaufmann, San Francisco, Calif., 1998. If the nodes are not d-separated, then control passes to step 732. If the nodes are d-separated, the corresponding arc is added to E in step 728 and this pair of nodes is removed from L in step 730. In step 732 pointer p is updated to point to the next pair of nodes in L. It is determined in step 734 whether there are more nodes to process (i.e., p is not pointing to the end of L). If there are more nodes to process, then control passes to step 724 and steps 724-734 are repeated. If there are no more nodes to process, then processing moves on to phase II.

Figure 8:
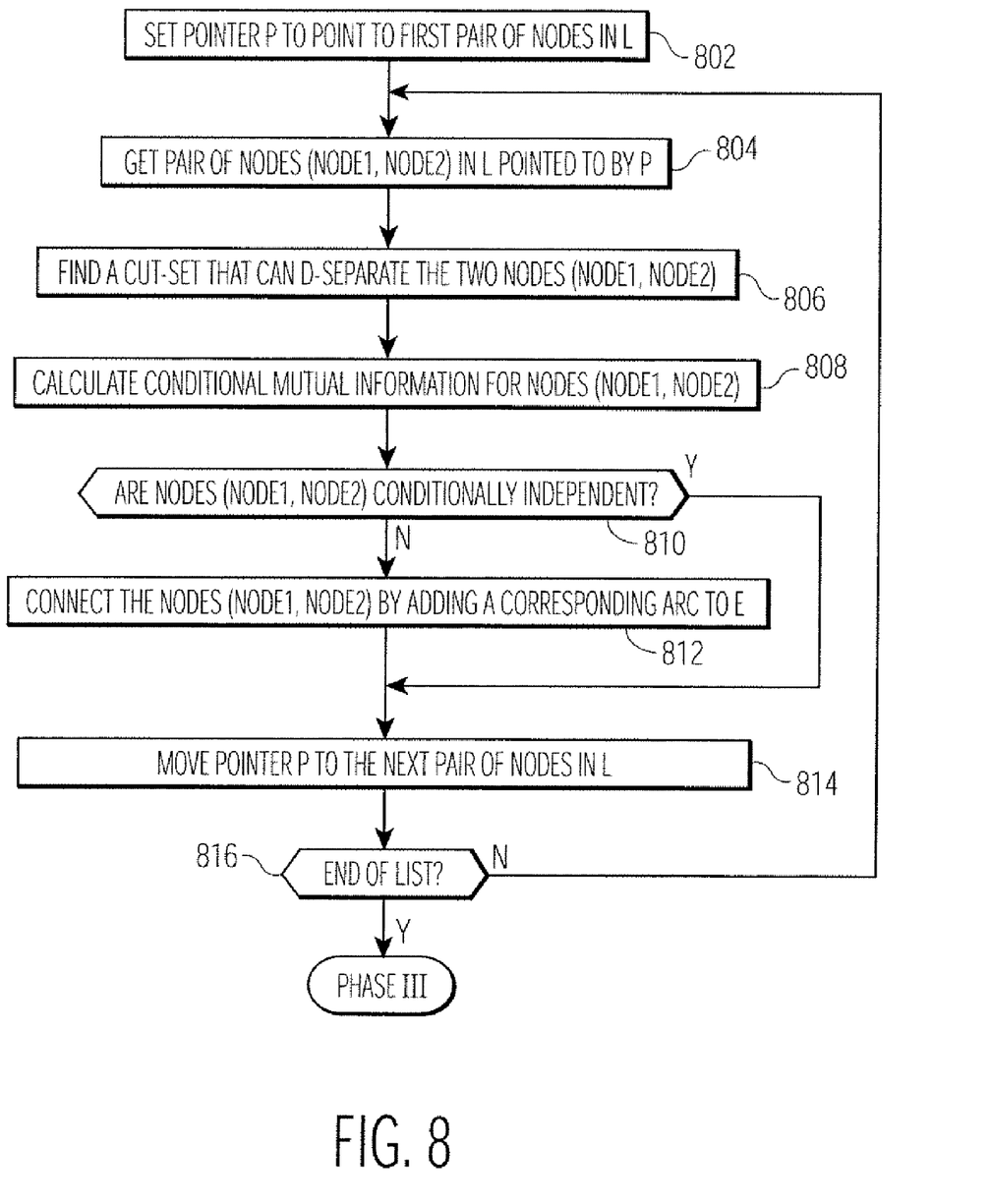
FIG. 8 shows a flowchart illustrating further details of phase II of the four-phase construction algorithm of FIG. 6.

FIG. 8 shows a flowchart illustrating further details of phase II of FIG. 6. First in step 802, pointer p is set to point to the first pair of nodes in L. Step 804 retrieves the pair of nodes (node1, node2) from L at the position of the pointer p. Step 806 finds a cut-set that can d-separate node1 and node2 in the current graph. Step 808 calculates the conditional mutual information using equation (2). Step 810 uses the calculation from step 808 to determine if node1 and node2 are conditionally independent given the cut-set. If yes, then control passes to step 814. If no, then step 812 connects the pair of nodes by adding a corresponding arc to E. In step 814 pointer P is updated to point to the next pair of nodes in L. It is determined in step 816 whether there are more nodes to process (i.e., p is not pointing to the end of L). If there are more nodes to process, then control passes to step 804 and steps 804-816 are repeated. If there are no more nodes to process, then processing moves on to phase III.

Further details of phase III are as follows. For each arc (node1, node2) in E, if there are other paths besides this arc between the two nodes, then this arc is removed from E temporarily. A cut-set is found that can d-separate node1 and node2 in the current graph. Equation (2) is used to calculate the conditional mutual information to determine if node1 and node2 are conditionally independent given the cut-set. If so, the arc is removed permanently. If not, this arc is added back to E.

Further details of phase IV are as follows. In phase IV, it is determined which nodes $v_i \in V\setminus\{c\}$ are in the Markov Blanket of the class node c. All nodes that are not part of the Markov Blanket are removed from V.

In phases II and III a cut-set must be found, which can be very computationally expensive if the graph is complex and there are many (e.g., hundreds) of paths between pairs of nodes. The first procedure described in J. Cheng, D. A. Bell, and W. Liu, "Learning belief networks from data: An information theory based approach," in CIKM, 1997, pp. 325-331 can be quite slow since it has to operate on all the paths. Therefore, in one embodiment a variation for calculating the cut set is used as follows:

$$\{\forall P_i \in Parents(node2) | P_i \perp node1\} \quad (3)$$

Based on equation (3), the cut-set consists of all parents from node2 which are d-connected with node1, if node2 is not an ancestor of node1. Although the cut-sets found using equation (3) may be larger than the cut-sets found by the first procedure described in J. Cheng, D. A. Bell, and W. Liu, "Learning Belief Networks From Data: An Information Theory Based Approach," in Proc. of Conf. on Information and Knowledge Management (CIKM), 1997, pp. 325-331, checking the d-separation takes little time and the resulting cut-set is often quite acceptable. With a proper object oriented implementation the parents should be accessible from each node directly without searching. Thus, in one embodiment the algorithm is implemented in an object oriented fashion, as is well known in the art, in which case the parents of a node are accessible in O(n) time.

Tests were conducted on data while varying the $\epsilon$ parameter of the Bayesian network construction algorithm between 0.01 and 0.3. A small $\epsilon$ leads to a large number of edges between the nodes, which results in a dense network. A large $\epsilon$ yields a sparse network and can lead to a network structure of a naive Bayesian classifier in which all graph nodes are only connected to the class node. The best result with an error of 0.93% was achieved with an $\epsilon$ between 0.19 and 0.22.

Figure 9:
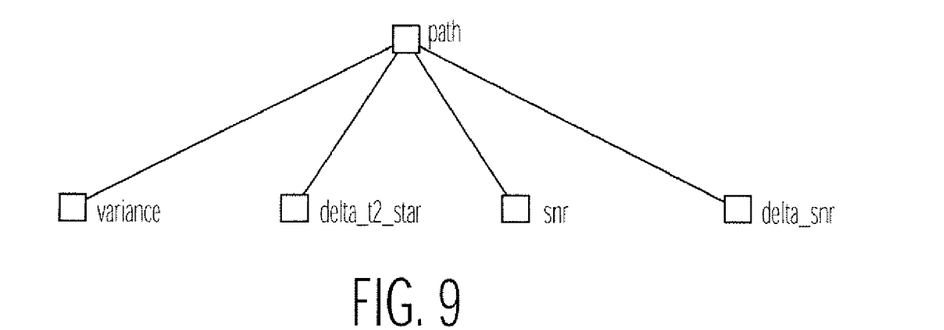
FIG. 9 illustrates an exemplary Bayesian network.
Figure 10:
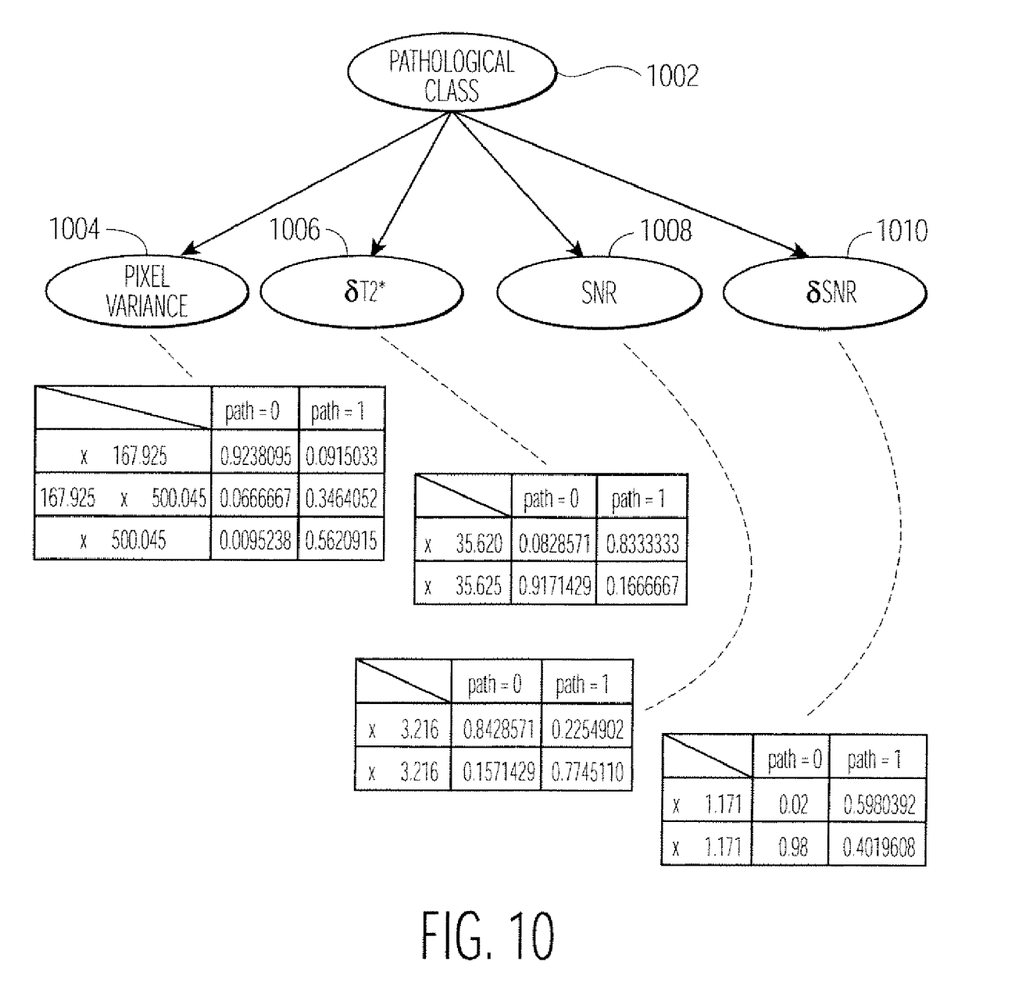
FIG. 10 illustrates an exemplary Bayesian network with probability tables.

Thus, from the above description, a model to classify metastases in lymph nodes is defined by 1) the discretization thresholds for the data, 2) the graph structure of the Bayesian network and 3) the probability tables of the graph nodes for the used parameters. The thresholds, which have to be used to discretize the data, are described above in conjunction with FIG. 4. The Bayesian network that was constructed using the above described algorithm and which shows the dependencies between the parameters is shown in FIG. 9. The Pixel Variance, SNR, $\delta$SNR and dT2* parameters are most influential for the pathological class and therefore the network consists of five graph nodes. The third component of the model consists of the probability tables for each graph node (i.e., parameter). These probability tables are shown together with the final graph in FIG. 10. FIG. 10 shows the Bayesian network with a node 1002 for the pathological class and nodes 1004, 1006, 1008, 1010 of the four most influential features, which in the example are imaging parameters. The table of each node shows the probabilities for the pathological class (benign or malignant) for each discretization range as listed in the first column of each table.

It is important to note that the classifier in this model is a naive Bayesian classifier and that it could also be generated by a much simpler learning algorithm than the one described above. The main reason that the learning algorithm described above yields a naive Bayesian classifier on the test dataset is the small number of features and their independence. The dataset consists only of six magnetic tissue parameters from which only four have a reasonable high mutual information to be considered influential for the pathological class. It is possible to lower the $\epsilon$ threshold until all parameters are represented in the classifier and a naive Bayesian graph is omitted. However, this leads to a graph with unreasonable relationships and irrelevant edges, for example the influence of the lymph Node/Muscle Ratio parameter on the T2* parameter. In addition, a too dense graph, which also includes such unreasonable relations with a very low mutual information, leads to worse classification results. Therefore, with a reasonable chosen $\epsilon$, the algorithm described herein produces a naive Bayesian classifier on this special dataset.

One reason to prefer the above described learning algorithm to simpler naive Bayesian algorithms is the possibility to add a variety of different features and generate complex Bayesian classifiers. For example, features may be added from additional magnetic tissue parameters, from the patient's medical records, from gene expression and protein expression, etc. In these more complex scenarios it is crucial to have an algorithm that is able to learn complex models and that can show the relations between the parameter.

Figure 11:
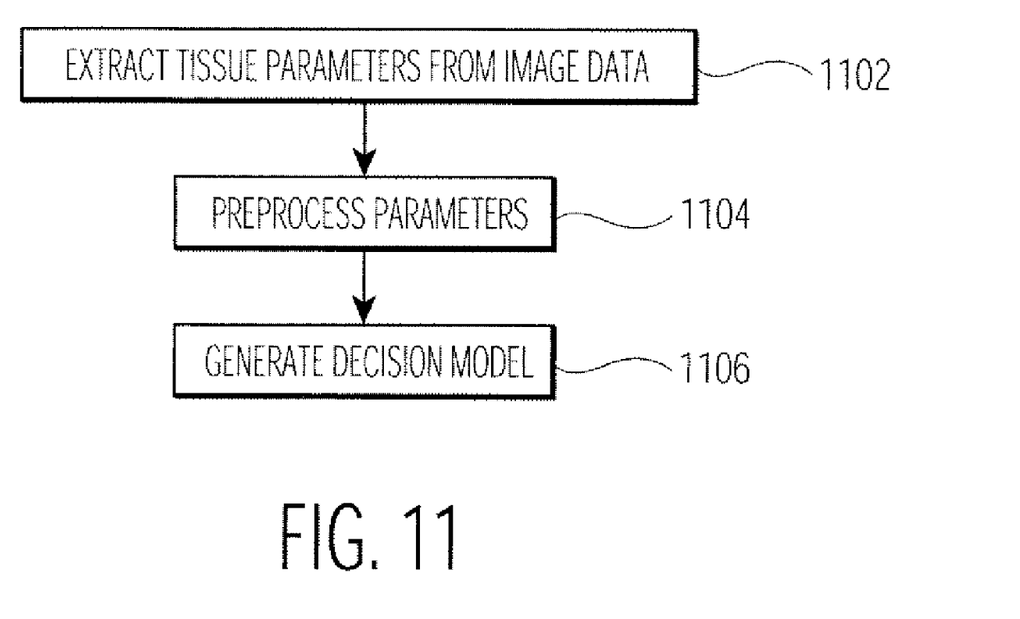
FIG. 11 shows a flowchart for generating a decision model using tissue parameters extracted from image data.

FIG. 11 shows an embodiment of the present invention, utilizing the above described techniques, for generating a decision model using tissue parameters extracted from image data. First, in step 1102, tissue parameters are extracted from image data. These extracted tissue parameters are used to generate training data to be used during a classification step. Next, in step 1104, the parameters are pre-processed. One type of pre-processing is the parameter discretization described above. Next, in step 1106, the pre-processed parameters are used as training data in order to generate a decision model (e.g., a Bayesian network). After the decision model is generated, the decision model may then be used to classify unknown tissue samples.

Figure 12:
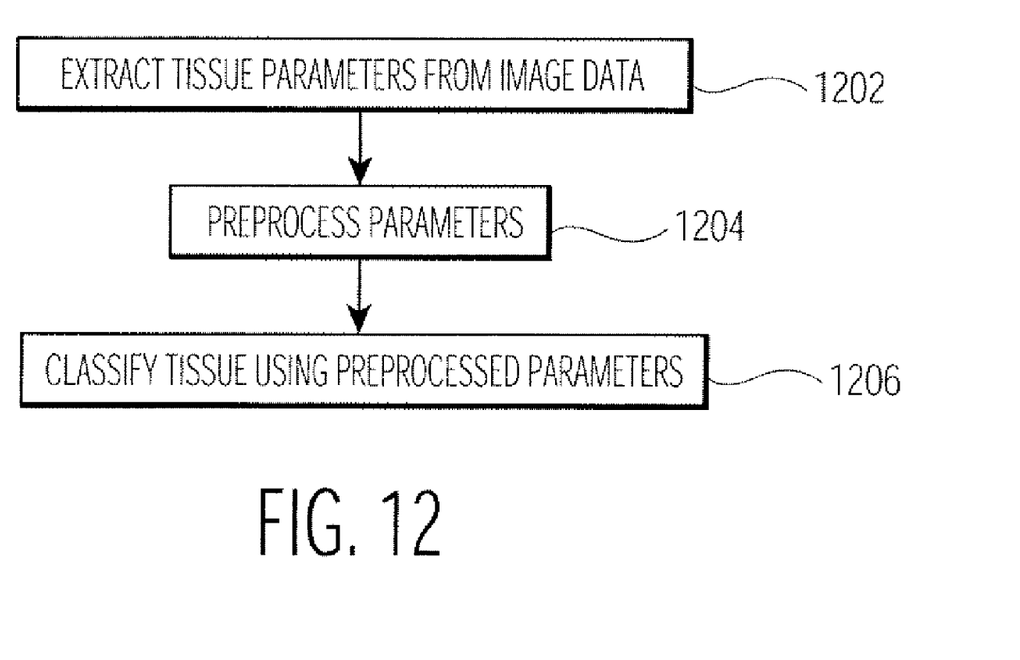
FIG. 12 shows a flowchart for classifying tissue using a previously generated decision model and tissue parameters extracted from image data.

FIG. 12 shows an embodiment of the present invention, utilizing the above described techniques, for classifying tissue using a previously generated decision model and tissue parameters extracted from image data. First, in step 1202, tissue parameters are extracted from image data of the tissue to be classified. Next, in step 1204, the parameters are pre-processed (e.g., discretized). In step 1206, the tissue is classified using a classification algorithm, a previously generated decision model (e.g., from FIG. 11) and the pre-processed parameters.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for classifying a pathological state of tissue based on image data comprising the steps of:
   extracting a plurality of tissue parameters from image data of tissue to be classified;
   preprocessing each of said plurality of tissue parameters; and
   classifying said tissue using a classification algorithm and said preprocessed tissue parameters, wherein the classification algorithm utilizes a decision model trained using a machine learning algorithm based on mutual information between a plurality of preprocessed tissue parameters of training data.

2. The method of claim 1 wherein said step of preprocessing comprises discretizing.

3. The method of claim 1 wherein said classification algorithm utilizes a Bayesian network.

4. The method of claim 1 wherein said tissue is a lymph node.

5. The method of claim 1 wherein said image data is image data from a magnetic resonance imaging machine.

6. The method of claim 5 wherein said image data comprises:
   a pre-contrast scan prior to the intravenous administration of lymphotropic superparamagnetic nanoparticles; and
   a post-contrast scan following the intravenous administration of lymphotropic superparamagnetic nanoparticles.

7. The method of claim 1 wherein said tissue parameters include at least one of: LNM ratio, T2*, $\delta$T2*, SNR, $\delta$SNR and pixel variance.

8. The method of claim 1 wherein said step of classifying said tissue comprises classifying into a pathological class denoting benign or malignant.

9. The method of claim 1 wherein said step of extracting a plurality of tissue parameters is performed manually.

10. The method for claim 1 wherein said step of extracting a plurality of tissue parameters is performed automatically.

11. A method for classifying a pathological state of tissue based on image data comprising the steps of:
    extracting a plurality of tissue parameters from image data;
    preprocessing said plurality of tissue parameters; and
    generating a decision model by performing a machine learning algorithm using said preprocessed tissue parameters, wherein the machine learning algorithm constructs the decision model based on mutual information between said plurality of parameters.

12. The method of claim 11 wherein said step of preprocessing comprises discretizing.

13. The method of claim 11 further comprising the step of:
    classifying patient tissue using said decision model and a plurality of tissue parameters extracted from image data of patient tissue.

14. The method of claim 11 wherein said step of performing a machine learning algorithm comprises:
    generating a Bayesian network.

15. The method of claim 14 wherein said step of generating a Bayesian network comprises performing a dependency analysis algorithm.

16. The method of claim 15 wherein said step of performing a dependency analysis algorithm comprises the steps of:
    generating a set of nodes of a dependency graph;

generating arcs between at least some of said nodes in said dependency graph;

deleting at least some of the said arcs; and deleting nodes that are not in a Markov Blanket of a class node.

17. The method of claim 11 wherein said tissue is a lymph node.

18. The method of claim 11 wherein said image data is image data from a magnetic resonance imaging machine.

19. The method of claim 11 wherein said tissue parameters include at least one of: LNM ratio, T2*, δT2*, SNR, δSNR and pixel variance.

20. The method of claim 11 wherein said step of extracting tissue parameters is performed manually.

21. The method for claim 11 wherein said step of extracting tissue parameters is performed automatically.

22. The method of claim 11 wherein said image data is image data from a magnetic resonance imaging machine.

23. Apparatus for classifying a pathological state of tissue based on a plurality of tissue parameters extracted from image data of tissue to be classified, said apparatus comprising:

means for preprocessing each of said plurality of tissue parameters; and means for classifying said tissue using a classification algorithm and said preprocessed tissue parameters, wherein the classification algorithm utilizes a decision model trained using a machine learning algorithm based on mutual information between a plurality of preprocessed tissue parameters of training data.

24. The apparatus of claim 23 wherein said means for preprocessing comprises means for discretizing.

25. The apparatus of claim 23 wherein said classification algorithm utilizes a Bayesian network.

26. The apparatus of claim 23 wherein said tissue is a lymph node.

27. The apparatus of claim 23 wherein said image data is image data from a magnetic resonance imaging machine.

28. The apparatus of claim 23 wherein said tissue parameters include at least one of: LNM ratio, T2*, δT2*, SNR, δSNR and pixel variance.

29. Apparatus for classifying a pathological state of tissue using a plurality of tissue parameters extracted from image data, said apparatus comprising:

means for preprocessing said plurality of tissue parameters; and means for generating a decision model by performing a machine learning algorithm using said preprocessed tissue parameters, wherein the machine learning algorithm constructs the decision model based on mutual information between said plurality of parameters.

30. The apparatus of claim 29 wherein said means for preprocessing comprises means for discretizing.

31. The apparatus of claim 29 wherein said decision model comprises a Bayesian network.

32. The apparatus of claim 29 wherein said tissue is a lymph node.

33. The apparatus of claim 29 wherein said image data is image data from a magnetic resonance imaging machine.

34. The apparatus of claim 29 wherein said tissue parameters include at least one of: LNM ratio, T2*, δT2*, SNR, δSNR and pixel variance.

* * * * *